US012760184B2

(12) United States Patent
Saha et al.

(10) Patent No.: US 12,760,184 B2
(45) Date of Patent: Oct. 13, 2026

(54) YTTRIA-STABILIZED ZIRCONIA SLURRY AND METHODS OF APPLICATION THEREOF

(71) Applicant: General Electric Company, Schenectady, NY (US)

(72) Inventors: Atanu Saha, Bengaluru (IN); Bernard Patrick Bewlay, Niskayuna, NY (US); Neelesh Nandkumar Sarawate, Pleasanton, CA (US)

(73) Assignee: General Electric Company, Evendale, OH (US)

( * ) Notice: Subject to any disclaimer, the term of this patent is extended or adjusted under 35 U.S.C. 154(b) by 1053 days.

(21) Appl. No.: 17/841,861

(22) Filed: Jun. 16, 2022

(65) Prior Publication Data

US 2023/0312935 A1 Oct. 5, 2023

(30) Foreign Application Priority Data

Mar. 30, 2022 (IN) ............................. 202211018839

(51) Int. Cl.

*C09D 1/00* (2006.01)

*C04B 35/488* (2006.01)

(Continued)

(52) U.S. Cl.

CPC .............. *C09D 1/00* (2013.01); *C04B 35/488* (2013.01); *C04B 35/505* (2013.01); *C04B 35/6316* (2013.01); *C04B 2235/3225* (2013.01); *C04B 2235/3246* (2013.01); *C04B 2235/5436* (2013.01)

(58) Field of Classification Search

None

See application file for complete search history.

(56) References Cited

U.S. PATENT DOCUMENTS 7,981,530 B2 7/2011 Sporer et al.
8,096,030 B2 1/2012 Graichen (Continued)

OTHER PUBLICATIONS

E. López-Honorato et al., Improvements to the sintering of yttria-stabilized zirconia by the addition of Ni, Ceramics International, vol. 38, Issue 8, 2012, pp. 6777-6782 (Year: 2012).*

(Continued)

*Primary Examiner* — Elizabeth Collister

(74) *Attorney, Agent, or Firm* — Dority & Manning, P.A.

(57) ABSTRACT

Coated components, along with methods of their formation, are provided. The coating may include a component having a surface and a coating over the surface of the component. The coating may include a first plurality of coarse micrograins having an coarse median grain size of greater than 10 µm to 20 µm, a second plurality of medium micrograins having a medium median grain size of 4 µm to 10 µm, a third plurality of fine micrograins having a fine median grain size of 0.001 µm to less than 4 µm. Each of the coarse micrograins, medium micrograins, and fine micrograins may include, independently, a yttria-stabilized zirconia (YSZ) constituent having a chemical formula of $(ZrO_2)_{(1-x)}(Y_2O_3)_x$ with x is from greater than 0 to less than 1.

18 Claims, 7 Drawing Sheets

(51) Int. Cl.
*C04B 35/505* (2006.01)
*C04B 35/63* (2006.01)

(56) References Cited

U.S. PATENT DOCUMENTS

| | | | | |
|---|---|---|---|---|
| 8,821,116 | B2 | 9/2014 | Duval et al. | |
| 9,387,512 | B2 | 7/2016 | Lee et al. | |
| 10,213,883 | B2 | 2/2019 | Roberts et al. | |
| 10,815,783 | B2 | 10/2020 | Diwinsky et al. | |
| 11,549,169 | B2 | 1/2023 | Guo et al. | |
| 2004/0214938 | A1 | 10/2004 | Ruud et al. | |
| 2010/0126907 | A1 | 5/2010 | Chun et al. | |
| 2013/0156958 | A1 | 6/2013 | Belov et al. | |
| 2016/0333471 | A1 | 11/2016 | Lee et al. | |
| 2018/0050964 | A1 | 2/2018 | Mcevoy et al. | |
| 2018/0258783 | A1 | 9/2018 | Kirchhoff et al. | |
| 2019/0085865 | A1 | 3/2019 | Strock | |
| 2022/0106675 | A1 * | 4/2022 | Guo | C23C 4/129 |

OTHER PUBLICATIONS

A. Portinha et al., Characterization of thermal barrier coatings with a gradient in porosity, Surface and Coatings Technology, vol. 195, Issues 2-3, 2005, pp. 245-251 (Year: 2005).*

* cited by examiner

YTTRIA-STABILIZED ZIRCONIA SLURRY AND METHODS OF APPLICATION THEREOF

PRIORITY INFORMATION

The present application claims priority to Indian Provisional Patent Application Number 202211018839 filed on Mar. 30, 2022.

FIELD

The subject matter described herein relates to yttria-stabilized zirconia, including an yttria-stabilized zirconia slurry, and application methods thereof, such as for use in coatings in gas turbine engines.

BACKGROUND

Generally, gas turbine engines are subject to extreme operating conditions, such as high temperatures, pressures, and/or rotational speeds, thereby creating a strenuous environment for components. In particular, engine blades are subject to high stress, high centrifugal loads, and vibration as a result of these operating conditions, which may lead to damage to nearby components such as shroud assemblies, thereby increasing clearance gaps between the blades and the shroud assemblies and decreasing efficiency of the gas turbine engine.

This inefficiency can be prevented using a combination of factors. For example, coatings can be applied to articles that operate at or are exposed to high temperatures. Current coatings typically include using a bond coat between hot gas path components to help adhere the coating to the component. Another method of preventing coating defects is performing regular maintenance on the engine. However, routine maintenance of a gas turbine engine can include washing and reapplying the coating material onto the component. Such operations may be performed via engine disassembly, causing downtime in the engine leading to loss of service for extended periods of time.

Therefore, a low maintenance, longer lasting coating to extend the life of engine components, especially engine shroud components of a gas turbine engine, would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
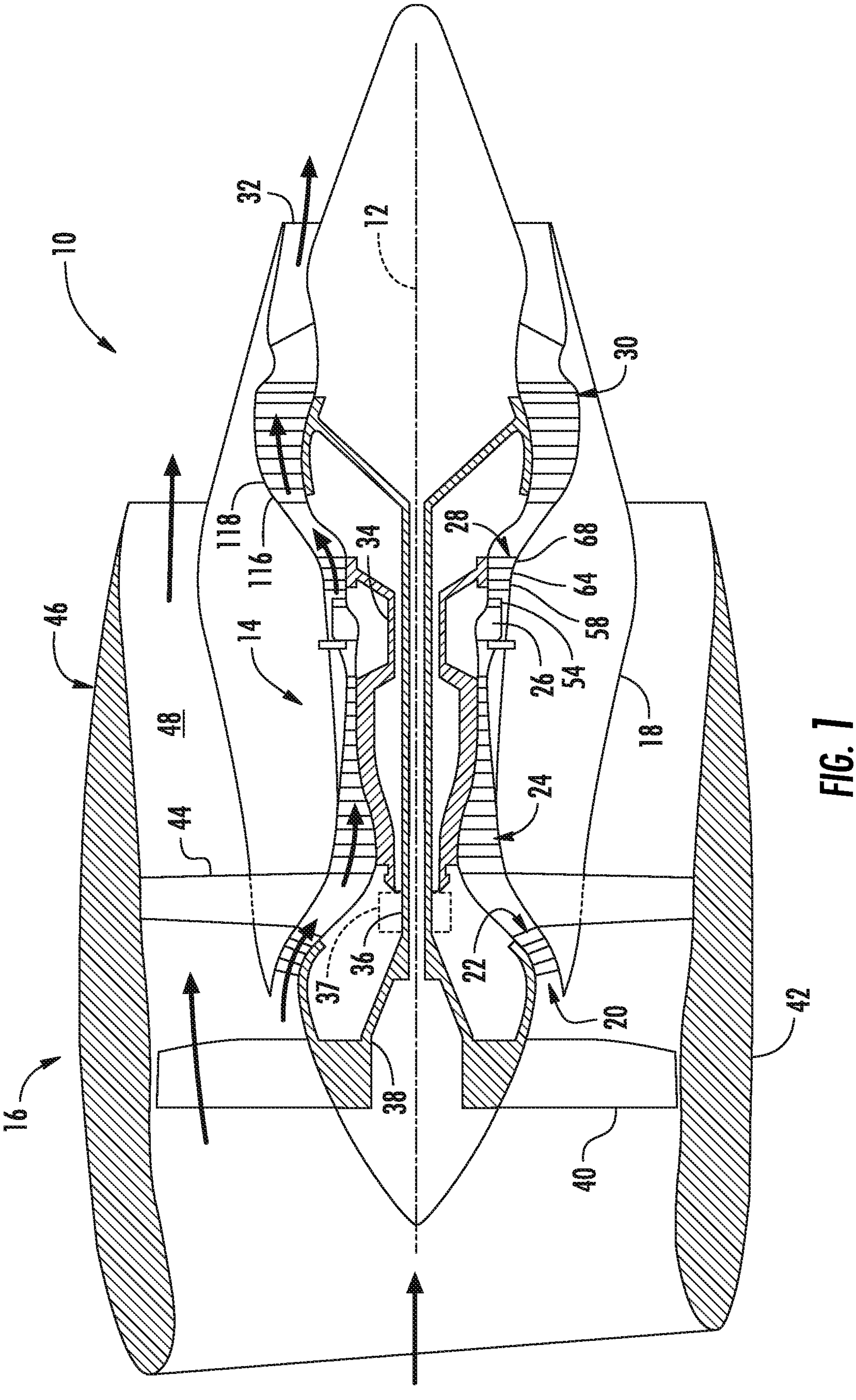
FIG. 1 is a schematic cross-sectional view of a gas turbine engine in accordance with one embodiment of the present disclosure.

Reference will now be made in detail to present embodiments of the present disclosure, one or more example of which are illustrated in the accompanying drawings. Each example is provided by way of explanation of the present disclosure and is not intended to be limiting. It will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modification and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first," "second," and "third" may be used interchangeably to distinguish one component from another and are not intended to signify location or importance of the individual components.

As used herein, the term "coating" refers to a material disposed on at least a portion of an underlying surface in a continuous or discontinuous manner. Further, the term "coating" does not necessarily mean a uniform thickness of the disposed material, and the disposed material may have a uniform or a variable thickness. The term "coating" may refer to a single layer of the coating material or may refer to a plurality of layers of the coating material. The coating material may be the same or different in the plurality of layers. Additionally, the term "coating system" may refer to a system or group of materials disposed on at least a portion of an underlying surface in a continuous or discontinuous manner. As used herein, the term "abradable coating" may refer to a material that may be abraded. In other words, if a component is coated with an abradable coating and rubs against a more abrasive material in motion, the former will be worn whereas the latter will have no or little wear.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to an yttria-stabilized zirconia slurry, methods of using such a slurry to form a coating on a component, and resulting coated components formed from the yttria-stabilized zirconia slurry. For example, the coated component may include an abradable coating made from the yttria-stabilized zirconia slurry and particularly suitable for use on a component of a turbomachine (e.g., a gas turbine engine). Generally, the yttria-stabilized zirconia slurry has a plurality of particles with a multimodal distribution of varying particle sizes of coarse particles, medium particles, and fine particles. In certain embodiments, the multimodal distribution of varying particle sizes further includes a coarse-to-medium particle size ratio between 2 and 4 and a medium-to-fine particle size ratio between 5 and 10. The yttria-stabilized zirconia slurry also includes a binder and a carrier fluid.

The multimodal distribution may include coarse particles, medium particles, and fine particles, with each of the coarse particles, medium particles, and fine particles comprising, independently, a yttria-stabilized zirconia (YSZ) constituent having a chemical formula of $(ZrO_2)_{(1-x)}(Y_2O_3)_x$ where x is from greater than 0 to less than 1. However, YSZ generally has little intrinsic strength and bonding after deposition, particularly at relatively low temperatures. Without wishing to be bound by any particular theory, it is believed that the coarse particles ultimately form an interconnected network of micrograins (e.g., with an average grain size of greater than 10 μm to 20 μm) with the medium and fine particles filling interstitial space between adjacent micrograins, while leaving some porosity in the coating for compliance. In addition, it is believed that the fine particles help to sinter the coarse and medium particles together to increase strength of the coating and increase bonding strength to the substrate.

A binder material may also be included in the slurry, such as silicon-based binder. For example, the silicon-based binder may include an inorganic silicon-based binder (e.g., silica, silicone, a polysiloxane, etc., or a mixture thereof) that is substantially free from carbon. During and after deposition, the silicon-based binder helps adhere the coarse particles, medium particles, and fine particles together and to the surface. Then, upon curing, the silicon-based binder decomposes to silica to further bond and sinter the coarse particles, medium particles, and fine particles together and to the surface. Such an inorganic silicon-based binder can reduce complications that could arise in subsequent processing steps that would otherwise be required to remove carbon materials. However, in alternative embodiments, the silicon-based binder may be an organic silicon-based binder (e.g., a polydimethylesiloxane) that includes carbon. When an organic silicon-based binder is included, any carbon materials may be burned out of the coating to remove the carbon materials from the resulting coating.

As stated, the slurry and method are particularly suitable for forming or repairing a coating for use on a component of a turbomachine. The term "turbomachine" or "turbomachinery" refers to a machine including one or more compressors, a heat generating section (e.g., a combustion section), and one or more turbines that together generate a torque output. The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

Referring now to the drawings, FIG. 1 is a schematic cross-sectional view of an exemplary high-bypass turbofan type engine 10 herein referred to as "turbofan 10" as may incorporate various embodiments of the present disclosure. As shown in FIG. 1, the turbofan 10 has a longitudinal or axial centerline axis 12 that extends therethrough for reference purposes. In general, the turbofan 10 may include a core turbine or gas turbine engine 14 disposed downstream from a fan section 16.

The gas turbine engine 14 may generally include a substantially tubular outer casing 18 that defines an annular inlet 20. The tubular outer casing 18 may be formed from multiple casings. The tubular outer casing 18 encases, in serial flow relationship, a compressor section having a booster or low-pressure (LP) compressor 22, a high-pressure (HP) compressor 24, a combustion section 26, a turbine section including a high-pressure (HP) turbine 28, a low-pressure (LP) turbine 30, and a jet exhaust nozzle section 32. A high-pressure (HP) shaft or HP spool 34 drivingly connects the HP turbine 28 to the HP compressor 24. A low-pressure (LP) shaft or LP spool 36 drivingly connects the LP turbine 30 to the LP compressor 22. The (LP) spool 36 may also be connected to a fan spool 38 or shaft of the fan section 16. In particular embodiments, the (LP) spool 36 may be connected directly to the fan spool 38 such as in a direct-drive configuration. In alternative configurations, the (LP) spool 36 may be connected to the fan spool 38 via a speed reduction device 37 such as a reduction gear gearbox in an indirect-drive or geared-drive configuration. Such speed reduction devices may be included between any suitable shafts/spools within turbofan 10 as desired or required.

As shown in FIG. 1, the fan section 16 includes a plurality of fan blades 40 that are coupled to and that extend radially outwardly from the fan spool 38. An annular fan casing or nacelle 42 circumferentially surrounds the fan section 16 and/or at least a portion of the gas turbine engine 14. It should be appreciated by those of ordinary skill in the art that the nacelle 42 may be configured to be supported relative to the gas turbine engine 14 by a plurality of circumferentially-spaced outlet guide vanes 44. Moreover, a downstream section 46 of the nacelle 42 (downstream of the circumferentially-spaced outlet guide vanes 44) may extend over an outer portion of the gas turbine engine 14 so as to define a bypass airflow passage 48 therebetween.

Figure 2:
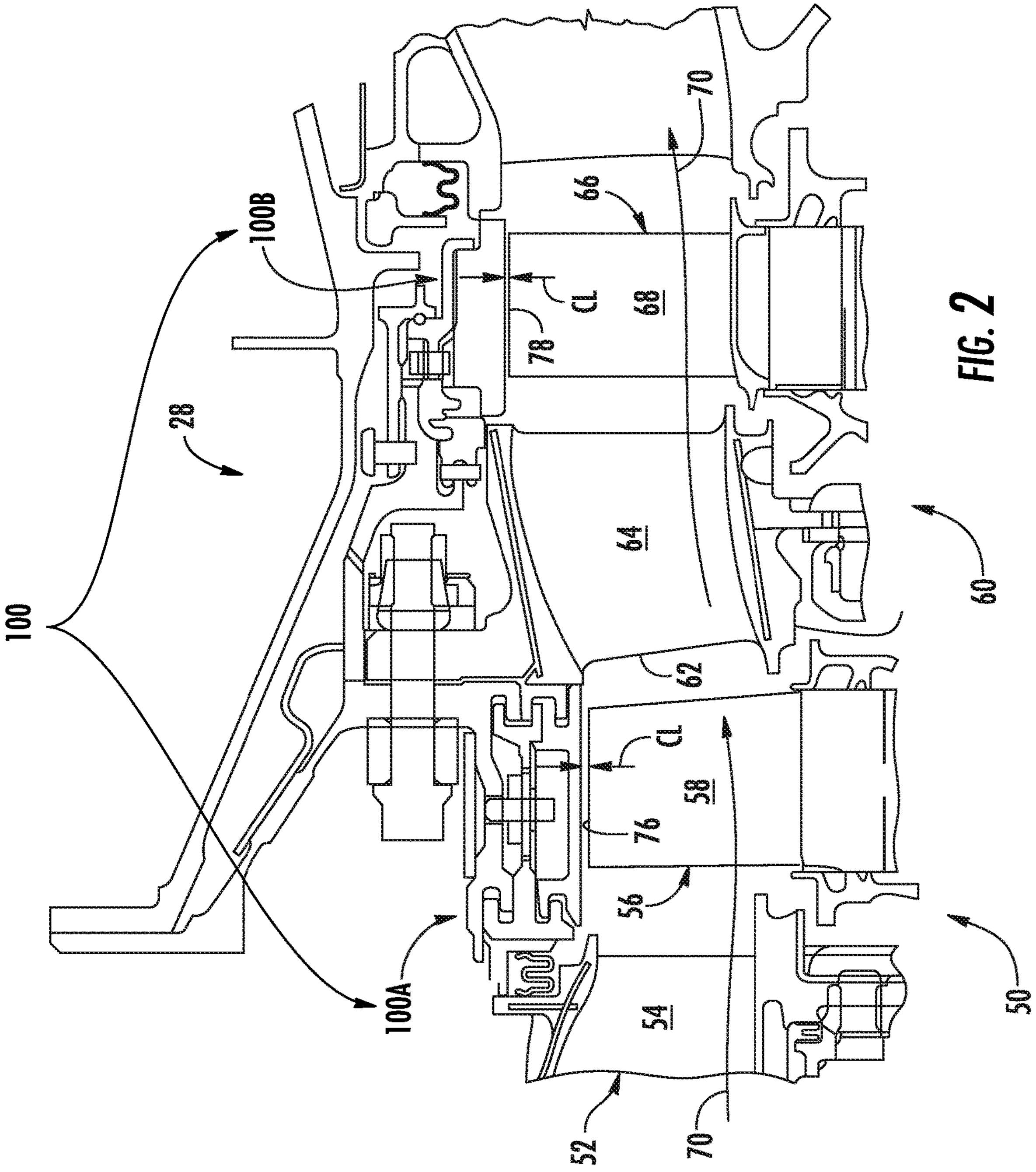
FIG. 2 is an enlarged cross sectional side view of a high-pressure turbine portion of a gas turbine engine in accordance with one embodiment of the present disclosure.

FIG. 2 provides an enlarged cross sectioned view of the HP turbine 28 portion of the gas turbine engine 14 as shown in FIG. 1, as may incorporate various embodiments of the present disclosure. As shown in FIG. 2, the HP turbine 28 includes, in serial flow relationship, a first stage 50 which includes an annular array 52 of stator vanes 54 (only one shown) axially spaced from an annular array 56 of turbine rotor blades 58 (only one shown). The HP turbine 28 further includes a second stage 60 which includes an annular array 62 of stator vanes 64 (only one shown) axially spaced from an annular array 66 of turbine rotor blades 68 (only one shown). The turbine rotor blades 58, 68 extend radially outwardly from and are coupled to the HP spool 34 (FIG. 1). As shown in FIG. 2, the stator vanes 54, 64 and the turbine rotor blades 58, 68 at least partially define a gas flowpath 70 for routing combustion gases from the combustion section 26 (FIG. 1) through the HP turbine 28.

As further shown in FIG. 2, the HP turbine 28 may include one or more shroud assemblies 100, each of which forms an annular ring an annular array 56, 66 of rotor blades 58, 68. For example, a shroud assembly 100A may form an annular ring around the annular array 56 of the rotor blades 58 of the first stage 50, and a second shroud assembly 100B may form an annular ring around the annular array 66 of rotor blades 68 of the second stage 60. In general, shrouds of the shroud assemblies 100A, 100B (collectively, shroud assemblies 100) are radially spaced from blade tips 76, 78 of each of the rotor blades 68. A radial or clearance gap CL is defined between the blade tips 76, 78 and the shroud assemblies 100. The shroud assemblies 100 generally reduce leakage from the gas flowpath 70.

It should be noted that the shroud assemblies 100 may additionally be utilized in a similar manner in the LP compressor 22, HP compressor 24, and/or LP turbine 30. Accordingly, shroud assemblies 100 as disclosed herein are not limited to use in the HP turbine 28, and rather may be utilized in any suitable section of the gas turbine engine 14.

Figure 3:
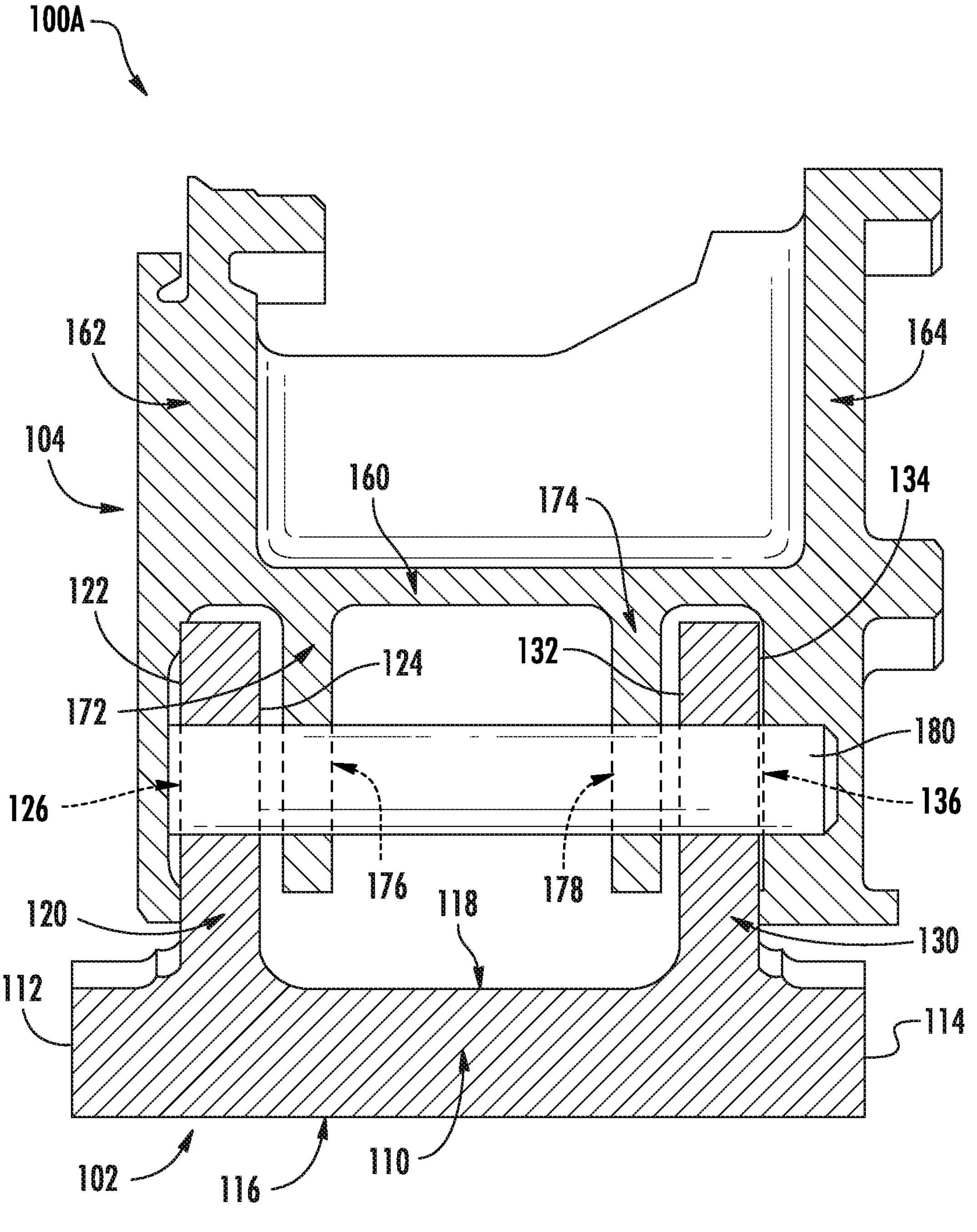
FIG. 3 is a cross-sectional view of a shroud assembly in accordance with one embodiment of the present disclosure.

Referring now to FIG. 3, a shroud assembly 100A is illustrated, which includes a shroud 102 and a hanger 104 in accordance with the present disclosure. A shroud 102 in accordance with the present disclosure may include, for example, a shroud body 110, a forward flange 120, and a rear flange 130. In exemplary embodiments, the shroud body 110 and flanges 120, 130 (and shroud 102 in general) may be formed from a CMC material, although in alternative embodiments the shroud body 110 and flanges 120, 130 (and shroud 102 in general) may be formed from another suitable material such as a metal, etc. In some embodiments, shroud body 110 and flanges 120, 130 may be integral and thus generally formed as a single component.

Shroud body 110 may include a forward surface 112 and a rear surface 114. The rear surface 114 is axially spaced from the forward surface 112, such as generally along the axial centerline axis 12 when in the turbofan 10. An inner surface 116 and an outer surface 118 may each extend between the forward surface 112 and the rear surface 114. The outer surface 118 is radially spaced from the inner surface 116. Inner surface 116 may, when the shroud 102 is in turbofan 10, be exposed to the gas flowpath 70, while outer surface 118 is thus radially spaced from the gas flowpath 70.

Forward flange 120 and rear flange 130 may each extend from the shroud body 110, such as from the outer surface 118 thereof. Rear flange 130 may be axially spaced from forward flange 120. Further, forward flange 120 may be generally positioned proximate the forward surface 112 of the shroud body 110, while rear flange 130 is generally positioned proximate the rear surface 114 of the shroud body 110. Each flange 120, 130 may include a forward surface 122, 132 (respectively) and a rear surface 124, 134 respectively. As shown, the flanges 120, 130 may each extend generally circumferentially along their lengths, and thus be circumferentially oriented.

Further, one or more bore holes 126, 136 may be defined in each flange 120, 130, respectively. Each bore hole of the one or more bore holes 126, 136 may, for example, extend generally axially through the associated flange 120, 130 between the associated forward surface 122, 132 and associated rear surface 124, 134. The one or more bore holes 126, 136 are generally utilized for coupling the shroud 102 to the hanger 104. For example, pins 180 may be inserted into the one or more bore holes 126, 136 and associated bore holes of the hanger 104 to couple the shroud 102 to the hanger 104.

Referring still to FIG. 3, an exemplary hanger 104 is illustrated. Hanger 104 generally is coupled to and supports the shroud 102 in the turbofan 10 and is itself supported by various other components in the turbofan 10. Hanger 104 may include a hanger body 160, and a forward hanger arm 162 and rear hanger arm 164 extending from the hanger body 160, such as radially outward (away from gas flowpath 70) from the hanger body 160. Hanger body 160 may thus extend between the arms 162, 164. The rear arm 164 may be axially spaced from the forward arm 162, as shown.

Hanger 104 may further include one or more flanges extending from the hanger body 160, such as radially inward (towards gas flowpath 70) from the hanger body 160. For example, a forward flange 172 and a rear flange 174 may extend from the hanger body 160. Rear flange 174 may be axially spaced from forward flange 172. Forward flange 172 may be proximate forward hanger arm 162 and rear flange 174 may be proximate rear hanger arm 164. One or more bore holes 176, 178 may be defined in the flanges 172, 174, respectively.

When assembled, the bore holes 126, 136 of the shroud flanges 120, 130 may generally align with the associated hanger bore holes 176, 178. For example, bore holes 126 may align with bore holes 176, and bore holes 136 may align with bore holes 178. One or more pins 180 may be inserted through and thus extend through the associated bore holes to couple the hanger 104 and shroud 102 together. In some embodiments as shown, a pin 180 may extend through aligned bore holes 126, 176, 136 and 178. Alternatively, separate pins may be utilized for aligned bore holes 126, 176 and aligned bore holes 136, 178.

Figure 4:
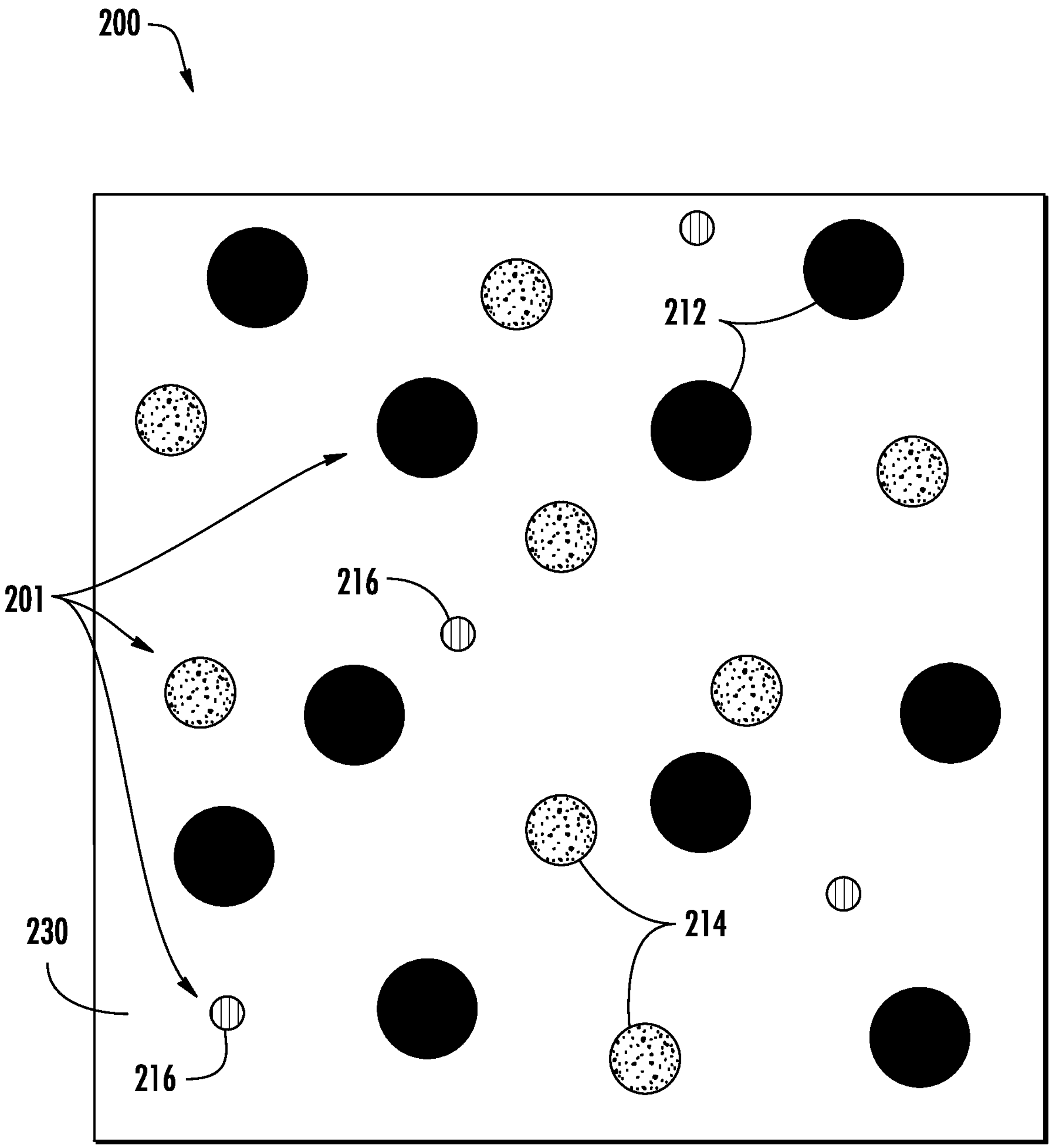
FIG. 4 is an illustration of particles of varying sizes within an exemplary slurry composition in accordance with one embodiment of the present disclosure.

Referring now to FIG. 4, an exemplary yttria-stabilized zirconia slurry 200 is illustrated. In the embodiment shown, the yttria-stabilized zirconia slurry 200 generally includes a plurality of multimodal particles 201 with a multimodal distribution of varying particle sizes dispersed within a carrier fluid 230. In particular, the plurality of multimodal particles 201 of varying particle sizes may include coarse particles 212, medium particles 214, and fine particles 216. For purposes of illustration, FIG. 4 shows coarse particles 212 with a solid fill, the medium particles 214 are shown with a dotted fill, and the fine particles 216 are illustrated with a vertical line fill. These particles are not drawn to size and are only one embodiment of the plurality of multimodal particles 201.

Generally, each of the coarse particles 212, medium particles 214, and fine particles 216 include, independently, a ceramic of one or more primary oxides, such as alumina, zirconia, yttria, ceria, mullite, and silica. In an exemplary embodiment, the one or more primary oxides may include yttria and zirconia such that the coarse particles 212, medium particles 214, and fine particles 216 includes, independently, an yttria-stabilized zirconia (YSZ) constituent, the YSZ constituent having a chemical formula of $(ZrO_2)_{(1-x)}(Y_2O_3)_x$. As used herein, "x" is a weight fraction, where x is greater than 0 and less than 1 (i.e., $0<x<1$). For example, x may be from 0.05 to 0.55, such as from 0.06 to 0.35, such as from 0.07 to 0.20, such as from 0.075 to 0.10. In one or more specific embodiments, x is 0.08. The composition of the yttria-stabilized zirconia slurry 200 is such that, once cured, yields an abradable coating 202 (as described hereafter with reference to FIG. 4) that is abradable, e.g., capable of being abraded.

In one embodiment, the fine particles 216 and/or the medium particles 214 may additionally and/or alternatively include a sintering additive. The sintering additive may be one or more of $Fe_2O_3$, $B_2O_3$, or MgO. As used herein, "sintering" refers to a process of forming a solid and/or porous mass using heat and/or compression, usually without liquefaction. Having a multimodal distribution of varying particle sizes may also help initiate sintering at a lower temperature, thereby promoting an enhanced rate of sintering while inhibiting delamination of the coating to help the coating withstand engine up-shock and high temperatures. In one particular embodiment, the coarse particles 212 may be substantially free from any sintering additive such that sintering is promoted between the grain boundaries formed by the coarse particles 212.

As stated, each of the coarse particles 212, medium particles 214, and fine particles 216 are dispersed within the carrier fluid 230. The carrier fluid 230 may be either aqueous based or organic based. For example, the carrier fluid 230 may be methanol, ethanol, propanol, butanol, pentanol, hexanol, heptanol, octanol, nonanol, decanol, dodecanol, diacetyl alcohol, acetone, methyl isobutyl ketone (MIBK), methyl ethyl ketone (MEK), toluene, heptane, xylene, ether, or combinations thereof. It will further be appreciated that the carrier fluid 230 may be any other suitable organic carrier fluid. The selection of the carrier fluid 230 can be adjusted to the humidity and/or temperature of the environment, which may affect the drying of the yttria-stabilized zirconia slurry 200. The yttria-stabilized zirconia slurry 200 may be configured to have a vapor pressure that can coat a surface under wet conditions without any dripping.

In one particular embodiment, the carrier fluid 230 is selected such that a binder material is soluble therein. For example, when the binder material comprises silicone, alcohol-based carrier fluids are particularly suitable. The binder material may then be included within the carrier fluid 230 up to its saturation point such that substantially all of the binder material is dissolved within the carrier fluid 230. In one embodiment, the binder material is included within the slurry 200 in a weight amount that is 2% to 10% of the total weight of the particles within the slurry 200 (i.e., the sum of the weight of the coarse particles 212, medium particles 214, and fine particles 216), such as 2.5% to 7.5%.

In particular embodiments, the plurality of multimodal particles 201 may include from greater than 0 to 50 volume percent of the coarse particles 212, from 40 to 90 volume percent of the medium particles 214, and from 10 to 40 volume percent of the fine particles 216. The multimodal distribution of varying particle sizes may further include a coarse-to-medium particle (e.g., coarse particles 212 to medium particles 214) size ratio 1 to 5, such as 2 to 4, such as 2.5. The medium-to-fine particle size (e.g., medium particles 214 to fine particles 216) ratio may be from 1 to 15, such as from 5 to 10, such as 7.

Generally, the coarse particles 212 have a larger median particle size than the medium particles 214. In turn, the medium particles 214 have a larger median particle size than the fine particles 216. For example, the coarse particles 212 may have a median particle size of greater than 10 μm to 20 μm, such as 12 μm to 18 μm (e.g., 15 μm to 17 μm). The medium particles 214 may have a median particle size from 4 μm to 10 μm (e.g., 6 μm to 9 μm) to help fill the voids formed between adjacent coarse particles 212 in the resulting coating (e.g., interstitial voids between coarse micrograins in the coating). The fine particles 216 may have a median particle size of 0.001 μm to less than 4 μm, such as 0.01 μm to 3 μm (e.g., 0.1 μm to 2 μm) to fill voids between the coarse particles 212 and medium particles 214 in the resulting coating.

In some exemplary embodiments, the coarse particles 212, the medium particles 214, and the fine particles 216 may combine to comprise from 15 volume percent to 35 volume percent of the yttria-stabilized zirconia slurry 200. In other embodiments, the coarse particles 212, the medium particles 214, and the fine particles 216, may combine to comprise from 20 volume percent to 30 volume percent of the yttria-stabilized zirconia slurry 200. In one specific non-limiting embodiment, the coarse particles 212, the medium particles 214, and the fine particles 216 may combine to be 27 volume percent of the yttria-stabilized zirconia slurry 200.

Figure 5A:
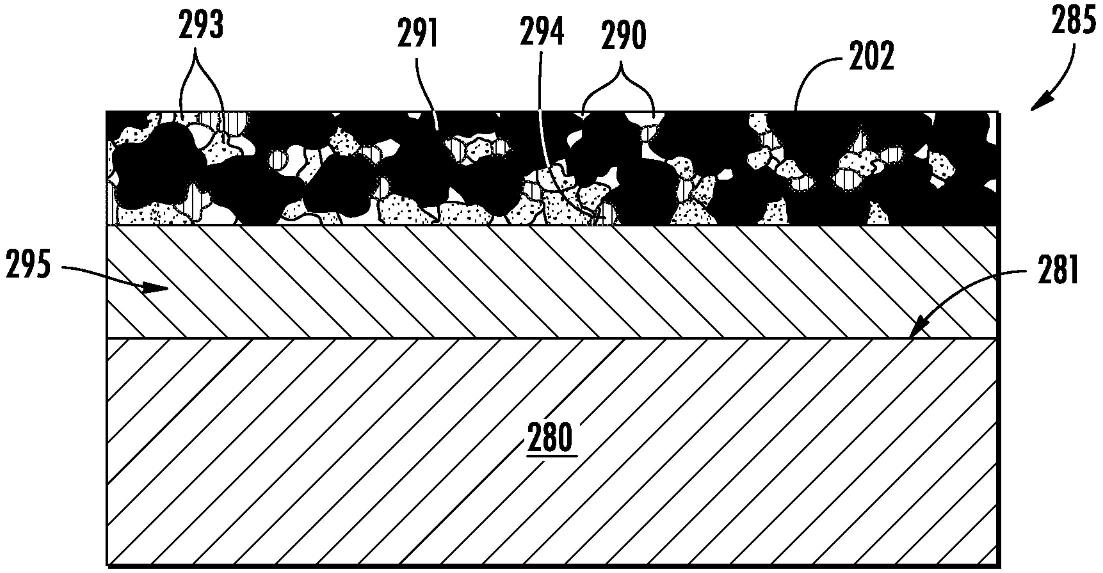
FIG. 5A is an illustration of an exemplary coated component having an abradable coating over a barrier coating on a substrate.
Figure 5B:
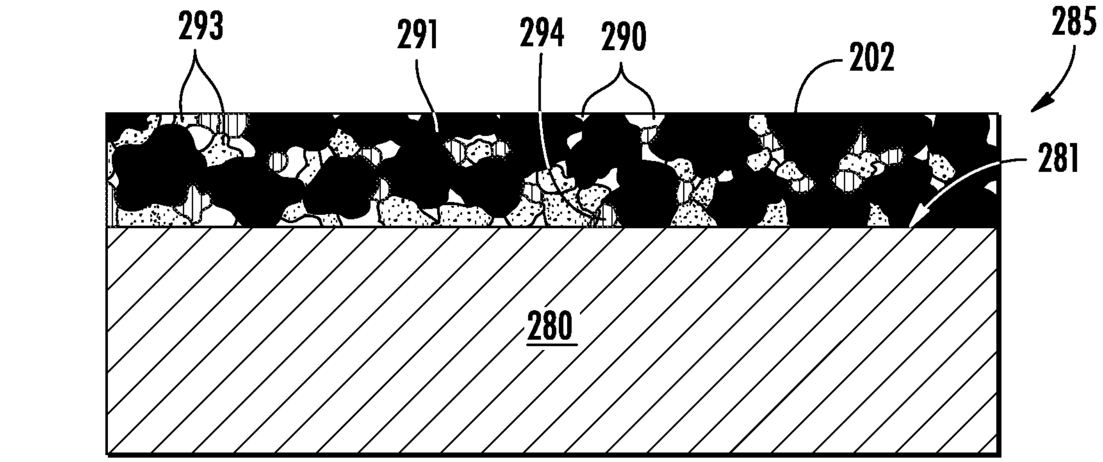
FIG. 5B is an illustration of an exemplary coated component having an abradable coating over a substrate.

As stated above, the slurry 200 with the plurality of multimodal particles 201 may be deposited onto a surface to form a coating having a microstructure with a porosity. Referring to FIGS. 5A and 5B, the yttria-stabilized zirconia slurry 200 (FIG. 4) may be applied over a surface 281 of a component 280 (e.g., of the gas turbine engine 14 of FIG. 3) and cured into an abradable coating 202 to form a coated component 285. In the embodiment shown in FIG. 5A, an optional barrier coating 295 (e.g., a thermal barrier coating or an environmental barrier coating) is shown on the surface 281 of the component 280 such that the abradable coating 202 is formed over the barrier coating 295. Thus, in the embodiment shown, the barrier coating 295 is positioned between the component 280 and the abradable coating 202. However, in the embodiment of FIG. 5B, the abradable coating 202 is formed directly on the surface 281 of the component 280.

In the embodiments shown in FIGS. 5A and 5B, the coating 202 includes a first plurality of coarse micrograins 291 that have a coarse median grain size of greater than 10 μm to 20 μm. These first plurality of coarse micrograins 291 are generally formed from the plurality of coarse particles 212 (FIG. 3). A second plurality of medium micrograins 293 having a medium median grain size of 4 μm to 10 μm are also included in the coating 202. The second plurality of medium micrograins 293 are generally formed from the plurality of medium particles 214 (FIG. 3) and are positioned within the interstitial area between the micrograins of adjacent coarse micrograins 291. The coating 202 also includes a third plurality of fine micrograins 294 having a fine median grain size of 0.001 μm to less than 4 μm. The third plurality of fine micrograins 294 are generally formed from the plurality of fine particles 216 (FIG. 3) and are positioned within the interstitial area between the micrograins of adjacent coarse micrograins 291 and the medium micrograins 293. As stated, the fine micrograins 294 may provide cohesive strength for the coarse micrograins 291 and medium micrograins 293 the help adhere the coating 202, particularly the coarse micrograins 291, to the component 280 after sintering.

In one particular embodiment, the coating 202 has a gradient of the fine particles 294 therein such that the fine particles 294 have a higher concentration at the internal surface of the coating 202 nearest to the surface 281 of the component 280 than at an external surface of the coating 202 farthest from the surface 281. Thus, the coarse micrograins 291 may be more strongly bond together at its internal surface nearest to the surface 281 of the component 280.

Porosity 290 is defined in the abradable coating 202 in the form of voids/pores in the interstitial area between the micrograins of adjacent coarse micrograins 291 and the medium micrograins 293. The porosity 290 of the abradable coating 202 may be in a range from 10 vol. % and 80 vol. %, such as from 15 vol. % to 70 vol. %, such as from 20 vol. % to 50 vol. %. The average pore size may be in a range from 0.1 μm to 30 μm, such as from 0.5 μm to 20 μm, such as from 1 μm to 10 μm. The pores may be isolated, interconnected, or a combination of both. In at least some embodiments, the pores will be substantially uniformly distributed within the abradable coating 202. In one embodiment, the coating 202 has a gradient of porosity 290 therein such that the coating 202 has a higher porosity at its external surface than at the internal surface nearest to the surface 281 (i.e., the coating 202 is more dense closest to the surface 281 of the component 280 than at the opposite external surface).

The coated component 285, on a microscopic level, may also have a grain structure. Specifically, the grain structure is formed when the abradable coating 202 is prepared from mono- and/or multimodal particles and diffusion among the plurality of particles during sintering results in inter-particle bonding. Current techniques of applying coatings to components include use of an air plasma spray (APS) or electron beam physical vapor deposition (EBPVD); however, these techniques yield different microstructures, e.g., layers or columnar microstructures, respectively. Using the yttria-stabilized zirconia slurry 200 described herein, applied with the spraying technique, yields a grain microstructure with varying grain sizes, as described above with respect to FIGS. 5A and 5B.

Figure 6:
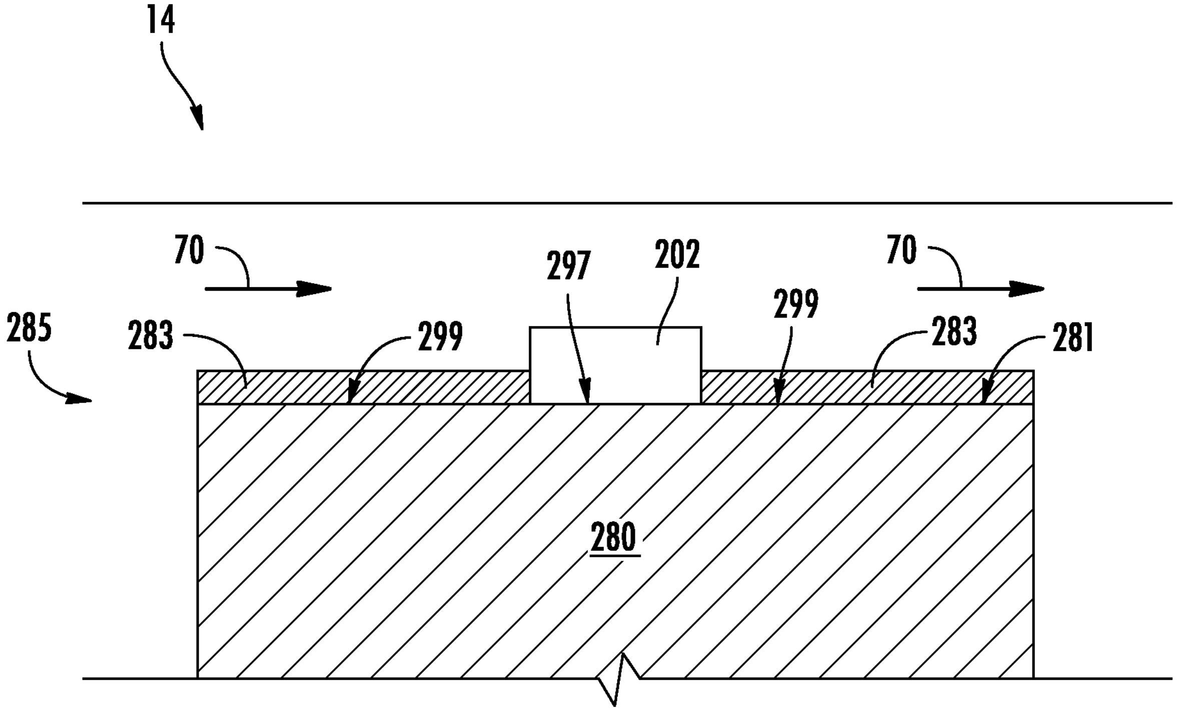
FIG. 6 is a cross section of a surface of a coated component.

Referring now to the embodiment of FIG. 6, a schematic of a coated component 285 with the abradable coating 202 on a coated region 297 of the surface 281 of the component 280 is shown. In particular, a mask material 283 is applied over an uncoated region 299 of the surface 281 to prevent formation of the abradable coating 202 in the masked area (corresponding to the uncoated region 299). That is, the yttria-stabilized zirconia slurry 200 (FIG. 4) is applied onto the uncovered portion to form the coated region 297 of the surface 281 of the component 280 positioned in the gas flowpath 70 of the gas turbine engine 14. In this embodiment, the mask material 283 may be first applied onto the uncoated region 299, followed by applying the slurry 200 to form the abradable coating 202 in the coated region 297, and then followed by removal of the mask material 283 to expose the uncovered portion 299 of the surface 281.

The yttria-stabilized zirconia slurry 200 may be applied to form the abradable coating 202 having a desired coating thickness, such as 1 μm to 3,000 μm (e.g., 1 μm to 1,000 μm).

In one particular embodiment, each of the mask material 283 and the yttria-stabilized zirconia slurry 200 (FIG. 4) is applied while the component 280 (FIG. 6) is positioned in situ on the gas turbine engine 14 (FIG. 1). Thus, the abradable coating 202 may be formed via an on-wing in situ repair method of the gas turbine engine 14. In such an embodiment, the yttria-stabilized zirconia slurry 200 may be formed into a green coating that is cured using heat from the gas turbine engine 14 during use thereof, to sinter into the abradable coating 202. In certain embodiments, the abradable coating 202 may be a native coating (e.g., an original coating) on the component 280. However, it will be appreciated that the yttria-stabilized zirconia slurry 200 may additionally or alternatively be used to repair an existing thermal barrier coating ("TBC"), e.g., as a restorative thermal barrier coating. For exemplary purposes, reference will be made herein to an "abradable coating 202," which generally refers to both native coatings and restorative thermal barrier coatings.

In some embodiments, the component 280 may be a part of the shroud assemblies 100; for example, the shroud 102. Referring again to FIG. 2, the yttria-stabilized zirconia slurry 200 may be applied to at least one of the first shroud assembly 100A and the second shroud assembly 100B on the surface facing the blade tips 76, 78, e.g., on the surface where the clearance gap CL is defined. The yttria-stabilized zirconia slurry 200, after curing, becomes the abradable coating 202 that can be abraded by the blade tips 76, 78 in order to make the clearance gap CL as small as possible. During operation of the gas turbine engine 14, rotating blades 58, 68 (collectively, "blades 68") may rub against the shroud assemblies 100, which could increase the clearance gap CL between the blades 68 and shroud assemblies 100. However, if the blades 68 continue to erode the shroud assemblies 100, e.g., to a point where there is too much clearance, efficiency in the gas turbine engine 14 may be decreased and/or maintenance may be required more frequently. Accordingly, after the yttria-stabilized zirconia slurry 200 has been applied and cured on the component 280, e.g., the shroud 102, to at least the target thickness T, the blade tips 76, 78 may rub against the shroud 102 to provide for a minimum clearance gap CL. The minimum clearance gap CL is small enough for the blade tips 76, 78 to clear the shroud assemblies 100 but not so large that the efficiency of the gas turbine engine 14 is sacrificed.

Furthermore, in some embodiments, surface 281 of the component 280 may be prepared before the yttria-stabilized zirconia slurry 200 is applied. For example, the coated region 297 may be roughened before the yttria-stabilized zirconia slurry 200 is applied to increase adherence and/or coverage on the coated region 297. As will be explained more in depth below, preparing the coated region 297 may include roughening the coated region 297, e.g., by grit blasting and/or hand grinding to create the roughness. Grit blasting may include using a portable grit blast unit and/or a grit blast cabinet. The portable grit blast may be used to apply a pressure of 50 PSI to 150 PSI (0.34 MPa to 1.03 MPa), such as 75 PSI to 125 PSI (0.51 MPa to 0.86 MPa). Further, in some embodiments, the grit may comprise a 16-grit, at a 100% media flow (e.g., 340 μin (8.636 μm)), where the media comprises SiC. In other embodiments, e.g., where a larger grit blasting unit is used, various media can be used at different conditions to roughen the surface 281. For example, a SiC media at 12 grit may be used. In some embodiments, the grit blast cabinet may exert a pressure from 50 PSI to 100 PSI (0.34 MPa to 0.69 MPa), such as 60 PSI to 80 PSI (0.41 MPa to 0.55 MPa). In certain non-limiting embodiments, roughening the surface 281 of the component 280 may create a roughness greater than 50 μin, greater than 100 μin (2.54 μm), greater than 200 μin (5.08 μm), or greater than 300 μin (7.62 μm). Preparing the surface 281 of the component 280 may further include using an alcohol wipe to clean the surface of the surface 281. Wax rods may also be applied in preparation of applying the yttria-stabilized zirconia slurry 200. However, it will be appreciated that any other means of roughening the coated region 297 of the component 280 may be used.

In one embodiment, the slurry 200 may be applied onto any residual barrier coating, onto any residual bond coat, or directly onto any exposed substrate (e.g., metal or oxidized metal or ceramic).

Figure 7:
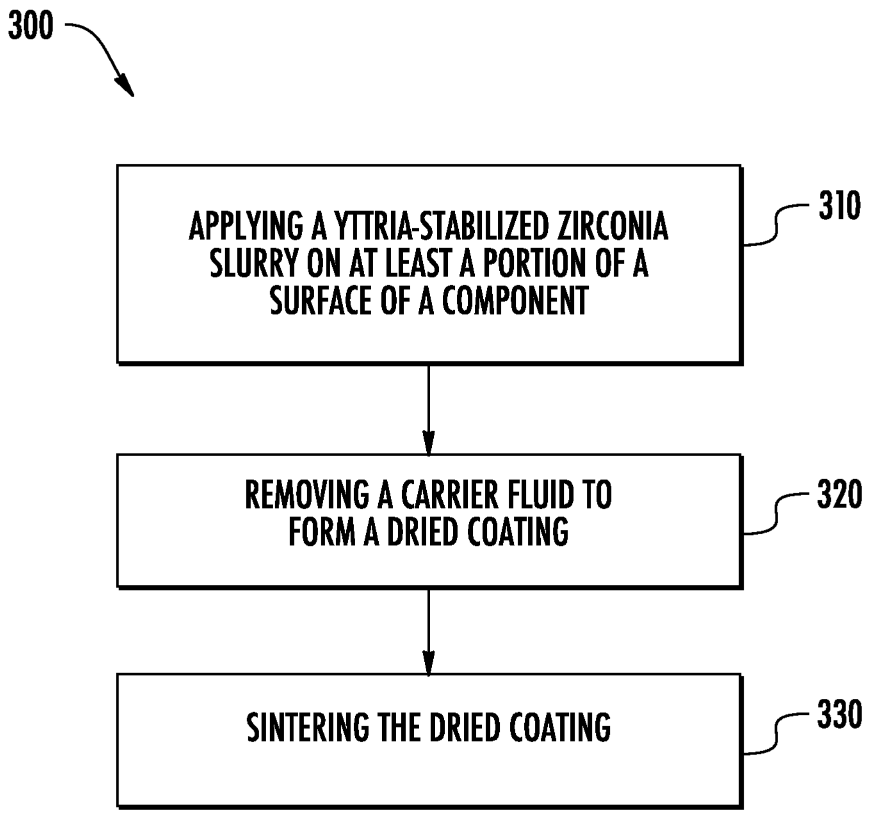
FIG. 7 is a flow diagram of one embodiment of a method for applying the slurry composition in accordance with one embodiment of the present disclosure.

Referring now to FIG. 7, an exemplary flowchart of one embodiment of a method 300 for coating a component is generally shown. The exemplary method 300 includes, at 310, applying an yttria-stabilized zirconia slurry on at least a portion of a surface of a component. As described above, the yttria-stabilized zirconia slurry may include a plurality of multimodal particles of varying particle sizes, including coarse particles, medium particles, and fine particles. Additionally, at 320, the method 300 includes removing the carrier fluid by drying the slurry to form a dried coating from the applied yttria-stabilized zirconia slurry. In certain exemplary embodiments where the component is a component of a gas turbine engine, the method may be performed in situ on the gas turbine engine. Finally, the dried coating may be sintered at 330 to form the final coating, such as by operating at a temperature sufficient to sinter the coating.

In particular, in block 310 of FIG. 7, the yttria-stabilized zirconia slurry 200 (FIG. 4) may be applied on the coated regions 297 of the surface 281 of the component 280 (FIG. 6) utilizing any suitable method. In one embodiment, the yttria-stabilized zirconia slurry 200 (FIG. 4) may be applied at an application temperature of 5° C. to 100° C., such as from 10° C. to 80° C., such as from 15° C. to 70° C., such as from 20° C. to 50° C. In one embodiment, the application temperature may be at room temperature (e.g., 20° C. to 25° C.). The coating thickness of the sprayed yttria-stabilized zirconia slurry 200 may be 1 micrometer (μm) or greater (e.g., 10 μm to 3 millimeters (mm)), such as 20 μm or greater (e.g., 20 μm to 3 mm), such 25 μm or greater (e.g., 25 μm to 1 mm). The yttria-stabilized zirconia slurry 200 may be applied as a single continuous layer that may cover the coated region. Optionally, the yttria-stabilized zirconia slurry 200 may be applied as several layers on top of each other.

Method 300 further includes, at 320, removing the carrier fluid 230 to form a dried coating. For example, the yttria-stabilized zirconia slurry 200 may be exposed to the air to evaporate the carrier fluid 230. The carrier fluid 230 can be evaporated at a relatively low temperature (e.g., room temperature of 20° C. to 100° C.) over a period of time (e.g, 5 hours, 10 hours, 15 hours, 20 hours, 24 hours, or more). In most embodiments, the carrier fluid 230 is removed while leaving the binder within the dried coating along with the plurality of multimodal particles 201.

Additionally, the method 300 may also include sintering the coating at 330 to cure the dried coating formed from the yttria-stabilized zirconia slurry. In embodiments where the method is executed in situ on the gas turbine engine, in particular, the dried coating may be cured using heat from the gas turbine engine itself. In some embodiments, curing the yttria-stabilized zirconia slurry may include burning out the binder, e.g., "idle curing." In some embodiments, the yttria-stabilized zirconia slurry can be heated at a rate of 10° C./min ramp-up to a desired temperature, e.g., the operating temperature of the gas turbine engine. In certain non-limiting embodiments, the binder is cured in the dried coating by heating the yttria-stabilized zirconia slurry for an hour at 511.11° C. (952° F.), such as to form silica when the binder is a silicon-based binder. A similar temperature schedule (e.g., 10° C./min ramp-down) may be used to cool the cured dried coating to room temperature. However, it will be appreciated that curing the dried coating can be carried out using other means as known to persons of ordinary skill, especially where the component is not a part of a gas turbine engine but rather part of some other machine. Alternatively, or additionally, the gas turbine engine can be used to heat the dried coating at an operating temperature of 900° C. to 1100° C. (e.g., 975° C. to 1050° C.) for a curing period (e.g., 5 hours to 10 hours), e.g., "active curing." The temperature of the gas turbine engine may be ramped up at a rate of 10° C./min to the desired ultimate temperature. This may include 8-10 hours of ramp up to the temperature and include a cool down period. In another embodiment, a furnace and/or the gas turbine engine can be used to cure the dried coating at the operating temperature and curing period. It will be appreciated, however, that the dried coating may be cured in any other manner as known to persons of ordinary skill in the art.

Further, in additional embodiments, sintering the yttria-stabilized zirconia slurry may increase particle-to-particle interaction of the plurality of multimodal particles 201, thus increasing the strength of the resulting coating. In these particular embodiments, the yttria-stabilized zirconia slurry may further include the sintering additive as mentioned above.

In some embodiments, the method may further include refining the thickness of the abradable coating 202 to the target thickness T. In exemplary embodiments, the coating thickness is greater than the distance of the minimal clearance gap CL (FIG. 2), e.g., so that there is substantially no clearance gap CL after application of the yttria-stabilized zirconia slurry 200. In other words, the yttria-stabilized zirconia slurry 200 is applied to a thickness such that the shroud assemblies 100 with the abradable coating 202 touches the blade tips 76, 78. The blade tips 76, 78 and the shroud assemblies 100, through abrasion, then define the clearance gap CL, making it as small as possible.

The method of applying the yttria-stabilized zirconia slurry provides protection of the component. For example, once cured, the abradable coating may have a thermal resistance to protect the component, e.g., the shroud, from the hot temperatures within the gas turbine engine during operation. Having the abradable coating on the component may also help improve engine efficiency, reduce exhaust gas temperature ("EGT") margins, and reduce fuel burn. Further, the abradable coating is compatible with the materials of the component, thereby negating the need for a bond coat and/or substrate. When the component is the shroud of the gas turbine engine, for example, the abradable coating is compatible with the materials of the shroud, which may comprise metals and/or CMCs. Specifically, these metals may include platinum aluminide, NiCrAlY, or CoNiCrAl. Additionally and/or alternatively, in other embodiments, the shroud assemblies may be made of a nickel-based superalloy.

It will also be appreciated that the yttria-stabilized zirconia slurry may be used on any component within any machine. For example, the yttria-stabilized zirconia slurry may be utilized in turbomachinery in general, including a high-by-pass turbofan jet engine ("turbofan"), turbojet, turboprop, and/or turboshaft gas turbine engines, including industrial and marine gas turbine engines and auxiliary power units.

Further aspects of the disclosure are provided by the subject matter of the following clauses:

1. A coated component comprising: a component having a surface; and a coating over the surface of the component, wherein the coating comprises a first plurality of coarse micrograins having an coarse median grain size of greater than 10 μm to 20 μm, a second plurality of medium micrograins having a medium median grain size of 4 μm to 10 μm, a third plurality of fine micrograins having a fine median grain size of 0.001 μm to less than 4 μm, wherein each of the coarse micrograins, medium micrograins, and fine micrograins comprise, independently, a yttria-stabilized zirconia (YSZ) constituent having a chemical formula of $(ZrO_2)_{(1-x)}(Y_2O_3)_x$, wherein x is from greater than 0 to less than 1.

2. The coating of any preceding clause, wherein the third plurality of fine micrograins further comprise a sintering agent.

3. The coating of any preceding clause, wherein the surface of the component comprises a metal, and wherein the coating is directly on the surface or over a bond coat over the surface.

4. The coating of any preceding clause, wherein the coating further comprises silica.

5. The coating of any preceding clause, wherein the coating has a porosity of 10 vol. % to 80 vol. %.

6. The coating of any preceding clause, wherein the coating extends from an internal surface nearest the surface of the component to an external surface opposite thereof, and wherein the coating has a gradient of the fine micrograins therein such that the fine micrograins have a higher concentration at the internal surface than at the external surface.

7. The coating of any preceding clause, wherein the coating extends from an internal surface nearest the surface of the component to an external surface opposite thereof, and wherein the coating has a gradient of porosity therein such that the coating has a higher porosity at the external surface than at the internal surface.

8. The coating of any preceding clause, wherein the first plurality of coarse micrograins comprises a first yttria-stabilized zirconia (YSZ) constituent having a chemical formula of $(ZrO_2)_{(1-x)}(Y_2O_3)_x$, wherein x is from greater than 0 to less than 1.

9. The coating of any preceding clause, wherein the second plurality of medium micrograins comprises a second yttria-stabilized zirconia (YSZ) constituent having a chemical formula of $(ZrO_2)_{(1-x)}(Y_2O_3)_x$, wherein x is from greater than 0 to less than 1.

10. The coating of any preceding clause, wherein the third plurality of fine micrograins comprises a third yttria-stabilized zirconia (YSZ) constituent having a chemical formula of $(ZrO_2)_{(1-x)}(Y_2O_3)_x$, wherein x is from greater than 0 to less than 1.

11. A method for coating a surface of a component using an yttria-stabilized zirconia slurry, the method comprising: applying the yttria-stabilized zirconia slurry on an exposed portion of the surface of the component, the yttria-stabilized zirconia slurry comprising: a carrier fluid; a binder material within the carrier fluid; a first plurality of coarse particles dispersed within the carrier fluid and having a coarse median particle average size of greater than 10 μm to 20 μm; a second plurality of medium particles dispersed within the carrier fluid and having a medium median particle size of 4 μm to 10 μm; and a third plurality of fine particles dispersed within the carrier fluid and having a fine median particle size of 0.001 μm to less than 4 μm, wherein each of the coarse particles, medium particles, and fine particles comprise, independently, a yttria-stabilized zirconia (YSZ) constituent having a chemical formula of $(ZrO_2)_{(1-x)}(Y_2O_3)_x$, wherein x is from greater than 0 to less than 1.

12. The method of any preceding clause, wherein the yttria-stabilized zirconia slurry is applied at an application temperature of 5° C. to 100° C.

13. The method of any preceding clause, wherein the yttria-stabilized zirconia slurry is applied to a coating thickness of 1 μm to 3,000 μm.

14. The method of any preceding clause, wherein the first plurality of coarse particles, the second plurality of medium particles, and the third plurality of fine particles form a multimodal distribution comprising greater than 0 vol. % to 50 vol. % of the coarse particles, from 40 vol. % to 90 vol. % of the medium particles, and from 10 vol. % to 40 vol. % of the fine particles.

15. The method of any preceding clause, wherein the multimodal distribution has a coarse-to-medium particle size ratio from 2 to 4.

16. The method of any preceding clause, wherein the multimodal distribution has a medium-to-fine particle size ratio from 5 to 10.

17. The method of any preceding clause, wherein the third plurality of fine particles further comprise a sintering agent.

18. The method of any preceding clause, wherein the binder material comprises an inorganic silicon-based binder.

19 The method of any preceding clause, further comprising: prior to applying the yttria-stabilized zirconia slurry on the exposed portion of the surface of the component, applying a mask material over a portion of the surface of the component leaving the exposed portion uncovered.

20. The method of any preceding clause, further comprising: after applying the yttria-stabilized zirconia slurry on the exposed portion of the surface of the component, removing the mask material from the portion of the surface.

21. The method of any preceding clause, wherein the binder material is solubilized within the carrier fluid.

22. The method of any preceding clause, further comprising: after applying the yttria-stabilized zirconia slurry on the exposed portion of the surface of the component, allowing the carrier fluid to evaporate to form a dried coating on the exposed portion of the component.

23. The method of any preceding clause, wherein the exposed portion of the surface comprises the metal without a coating thereon, the metal with a bond coat thereon, or the metal with a thermal barrier coating thereon.

24. An yttria-stabilized zirconia slurry comprising: a carrier fluid; a binder material within the carrier fluid; a first plurality of coarse particles dispersed within the carrier fluid and having a coarse median particle size of greater than 10 μm to 20 μm, wherein the first plurality of coarse particles comprises a first yttria-stabilized zirconia (YSZ) constituent having a chemical formula of $(ZrO_2)_{(1-x)}(Y_2O_3)_x$, wherein x is from greater than 0 to less than 1; a second plurality of medium particles dispersed within the carrier fluid and having a medium median particle size of 4 μm to 10 μm, wherein the second plurality of medium particles comprises a second yttria-stabilized zirconia (YSZ) constituent having a chemical formula of $(ZrO_2)_{(1-x)}(Y_2O_3)_x$, wherein x is from greater than 0 to less than 1; and a third plurality of fine particles dispersed within the carrier fluid and having a fine median particle size of 0.001 μm to less than 4 μm, wherein the third plurality of fine particles comprises a third yttria-stabilized zirconia (YSZ) constituent having a chemical formula of $(ZrO_2)_{(1-x)}(Y_2O_3)_x$, wherein x is from greater than 0 to less than 1, wherein the first plurality of coarse particles, the second plurality of medium particles, and the third plurality of fine particles form a multimodal distribution comprising greater than 0 vol. % to 50 vol. % of the coarse particles, from 40 vol. % to 90 vol. % of the medium particles, and from 10 vol. % to 40 vol. % of the fine particles, and wherein the multimodal distribution has a coarse-to-medium particle size ratio from 2 to 4 and a medium-to-fine particle size ratio from 5 to 10.

EXAMPLE

An exemplary yttria-stabilized zirconia slurry was sprayed onto a surface of a substrate. The yttria-stabilized slurry had 42.5 vol. % of coarse particles with a median particle size of 16 μm, 42.5 vol. % of medium particles with a median particle size of 8 μm, and 15 vol. % of fine particles with a medial particle size of 1 μm. The yttria-stabilized zirconia slurry also included a silicone-based binder commercially available as DOW®-249 from Dow Chemical, which made up 5 wt. % of the total powder weight. The yttria-stabilized zirconia slurry further included a mixture of butanol and ethanol as the carrier fluid, and made up 30 to 40 wt. % of the total powder weight.

The slurry was made by first dissolving the silicone based binder (DOW 249) in the organic solvent (serving as the carrier fluid) until the solution was clear, without any undissolved binder particle suspended in it. Separately, the YSZ powders of the three different particle sizes (coarse, medium, and fine) were mixed in a morter-pestle. The powder mixture was then added to organic solution and mixed for about 5 minutes at 1500 rpm.

The yttria-stabilized zirconia slurry was sprayed utilizing a hand held spray gun at a pressure of about 40 PSI and at a temperature of 22° C. The yttria-stabilized zirconia slurry was allowed to dry at the same temperature.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A coated component comprising:

a component having a surface; and a coating over the surface of the component, wherein the coating comprises a first plurality of coarse micrograins having an coarse median grain size of greater than 10 μm to 20 μm, a second plurality of medium micrograins having a medium median grain size of 4 μm to 10 μm, a third plurality of fine micrograins having a fine median grain size of 0.001 μm to less than 4 μm, wherein each of the coarse micrograins, medium micrograins, and fine micrograins comprise, independently, a yttria-stabilized zirconia (YSZ) constituent having a chemical formula of $(ZrO_2)_{(1-x)}(Y_2O_3)_x$, wherein x is from greater than 0 to less than 1, wherein the coating extends from an internal surface nearest the surface of the component to an external surface opposite thereof, and wherein the coating has a gradient of the fine micrograins therein such that the fine micrograins have a higher concentration at the internal surface than at the external surface.

2. The coating of claim 1, wherein the third plurality of fine micrograins further comprise a sintering agent.

3. The coating of claim 1, wherein the surface of the component comprises a metal, and wherein the coating is directly on the surface or over a bond coat over the surface.

4. The coating of claim 1, wherein the coating further comprises silica.

5. The coating of claim 1, wherein the coating has a porosity of 10 vol. % to 80 vol. %.

6. The coating of claim 1, wherein the coating extends from an internal surface nearest the surface of the component to an external surface opposite thereof, and wherein the coating has a gradient of porosity therein such that the coating has a higher porosity at the external surface than at the internal surface.

7. The coating of claim 1, wherein the first plurality of coarse particles comprises a first yttria-stabilized zirconia (YSZ) constituent having a chemical formula of $(ZrO_2)_{(1-x)}(Y_2O_3)_x$, wherein x is from greater than 0 to less than 1.

8. The coating of claim 1, wherein the second plurality of medium particles comprises a second yttria-stabilized zirconia (YSZ) constituent having a chemical formula of $(ZrO_2)_{(1-x)}(Y_2O_3)_x$, wherein x is from greater than 0 to less than 1.

9. The coating of claim 1, wherein the third plurality of fine particles comprises a third yttria-stabilized zirconia (YSZ) constituent having a chemical formula of $(ZrO_2)_{(1-x)}(Y_2O_3)_x$, wherein x is from greater than 0 to less than 1.

10. A method for coating a surface of a component using an yttria-stabilized zirconia slurry, the method comprising:

applying the yttria-stabilized zirconia slurry on an exposed portion of the surface of the component, the yttria-stabilized zirconia slurry comprising:

a carrier fluid;

a binder material within the carrier fluid;

a first plurality of coarse particles dispersed within the carrier fluid and having a coarse median particle average size of greater than 10 μm to 20 μm;

a second plurality of medium particles dispersed within the carrier fluid and having a medium median particle size of 4 μm to 10 μm; and a third plurality of fine particles dispersed within the carrier fluid and having a fine median particle size of 0.001 μm to less than 4 μm, wherein each of the coarse particles, medium particles, and fine particles comprise, independently, a yttria-stabilized zirconia (YSZ) constituent having a chemical formula of $(ZrO_2)_{(1-x)}(Y_2O_3)_x$, wherein x is from greater than 0 to less than 1, wherein the coating extends from an internal surface nearest the surface of the component to an external surface opposite thereof, and wherein the coating has a gradient of the fine micrograins therein such that the fine micrograins have a higher concentration at the internal surface than at the external surface.

11. The method of claim 10, wherein the yttria-stabilized zirconia slurry is applied at an application temperature of 5° C. to 100° C.

12. The method of claim 10, wherein the yttria-stabilized zirconia slurry is applied to a coating thickness of 1 μm to 3,000 μm.

13. The method of claim 10, wherein the first plurality of coarse particles, the second plurality of medium particles, and the third plurality of fine particles form a multimodal distribution comprising greater than 0 vol. % to 50 vol. % of the coarse particles, from 40 vol. % to 90 vol. % of the medium particles, and from 10 vol. % to 40 vol. % of the fine particles.

14. The method of claim 13, wherein the multimodal distribution has a coarse-to-medium particle size ratio from 2 to 4, and wherein the multimodal distribution has a medium-to-fine particle size ratio from 5 to 10.

15. The method of claim 10, wherein the third plurality of fine particles further comprise a sintering agent.

16. The method of claim 10, further comprising:

prior to applying the yttria-stabilized zirconia slurry on the exposed portion of the surface of the component, applying a mask material over a portion of the surface of the component leaving the exposed portion uncovered; and after applying the yttria-stabilized zirconia slurry on the exposed portion of the surface of the component, removing the mask material from the portion of the surface.

17. The method of claim 10, wherein the binder material is solubilized within the carrier fluid.

18. The method of claim 10, further comprising:

after applying the yttria-stabilized zirconia slurry on the exposed portion of the surface of the component, allowing the carrier fluid to evaporate to form a dried coating on the exposed portion of the component.

* * * * *